United States Patent [19]

Norton

[11] 4,334,993
[45] Jun. 15, 1982

[54] POTTED-TYPED SEAL WITH STRESS RELIEF AND METHOD OF MAKING SAME

[75] Inventor: William W. Norton, Lincolnshire, Ill.

[73] Assignee: Baxter Travenol Laboratories, Inc., Deerfield, Ill.

[21] Appl. No.: 100,684

[22] Filed: Dec. 5, 1979

[51] Int. Cl.³ .............................................. B01D 31/00
[52] U.S. Cl. .................................. 210/321.3; 55/158; 165/83; 264/262; 277/1
[58] Field of Search .................... 165/83, 69; 264/262, 264/138, 163, 261, 154; 210/22 A; 55/158; 277/1

[56] References Cited

U.S. PATENT DOCUMENTS

| | | | |
|---|---|---|---|
| 3,812,907 | 5/1974 | Linning | 165/83 |
| 3,833,291 | 4/1960 | Huggins | 165/83 |
| 4,001,110 | 1/1977 | Geen et al. | 210/321.3 |
| 4,031,012 | 6/1977 | Gics | 210/321.3 |
| 4,170,620 | 10/1979 | Rao et al. | 264/262 |
| 4,201,673 | 5/1980 | Kanno et al. | 210/321.3 |
| 4,219,426 | 8/1980 | Spekle et al. | 210/321.3 |

OTHER PUBLICATIONS

Japanese Application 53-102878 Laid Open for Inspection, Feb. 21, 1977.

Primary Examiner—Robert I. Smith
Attorney, Agent, or Firm—Paul C. Flattery; Gary W. McFarron; George H. Gerstman

[57] ABSTRACT

In a potted-type seal for sealing an opening in a relatively rigid housing stress-relief means is provided to prevent excessive shrinkage-induced stress between the compound and the housing. The stress relief means includes a relatively flexible peripheral lip portion as part of the housing or, preferably, as part of the potting compound, which lip portion flexes when the potting compound shrinks to reduce stress between the compound and the housing.

7 Claims, 8 Drawing Figures

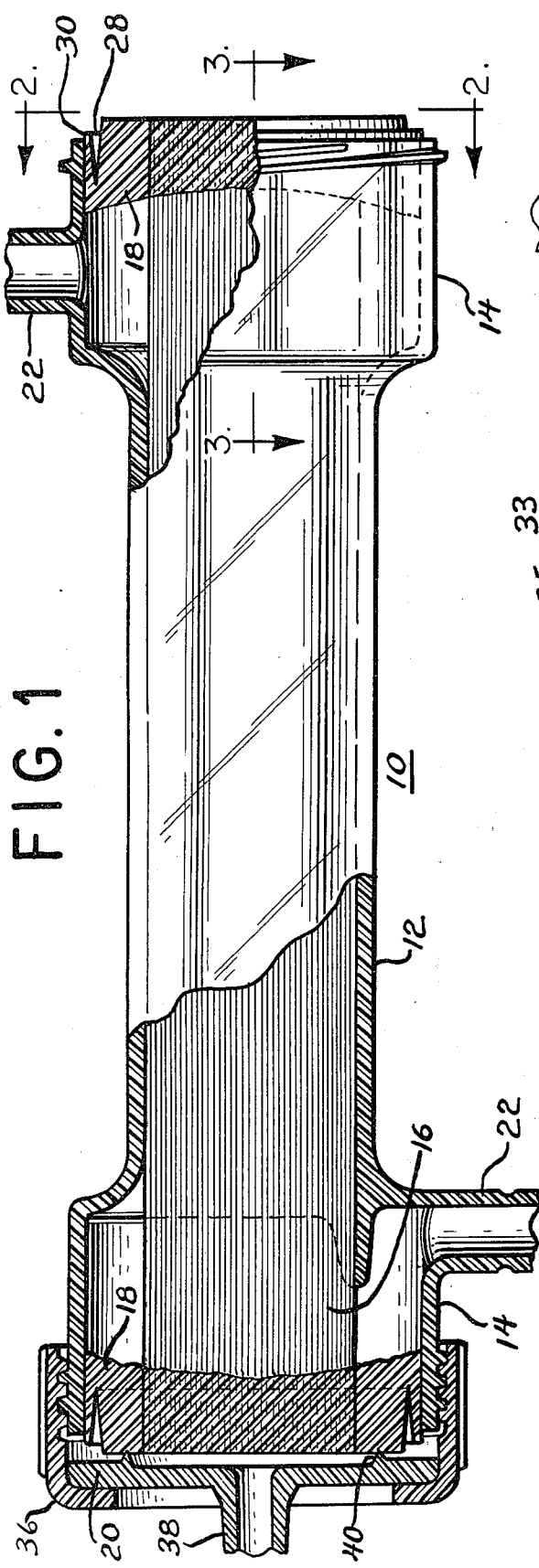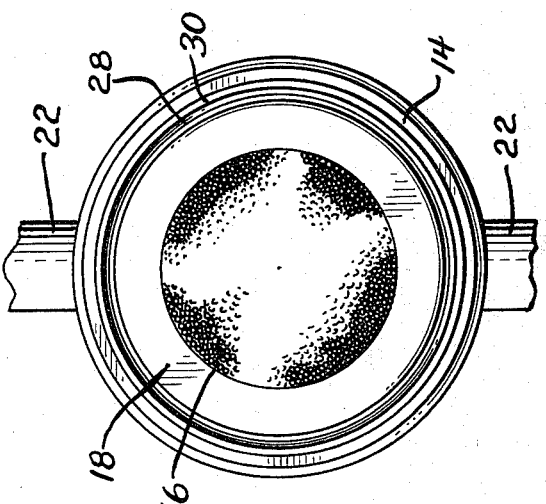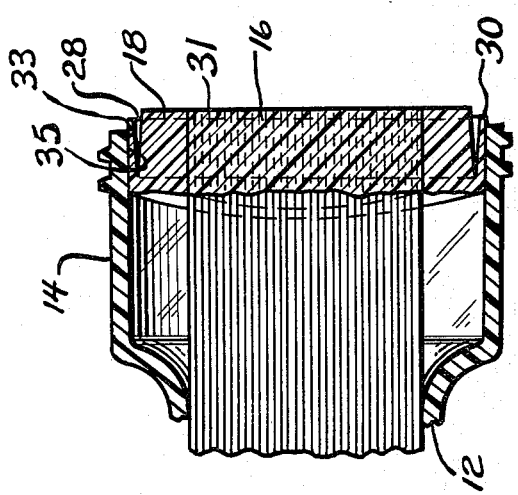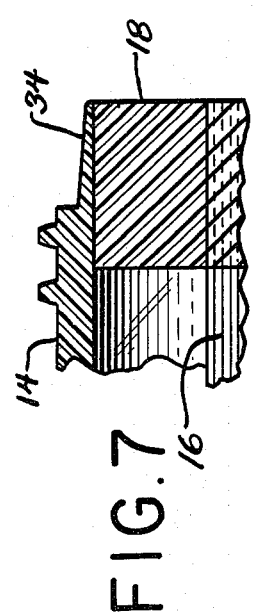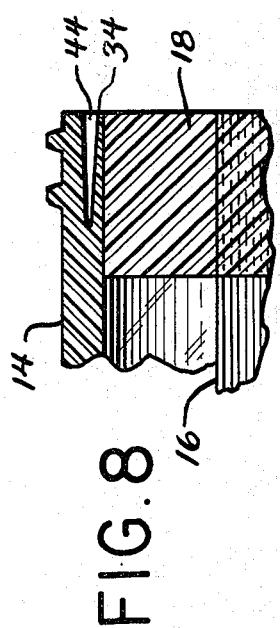

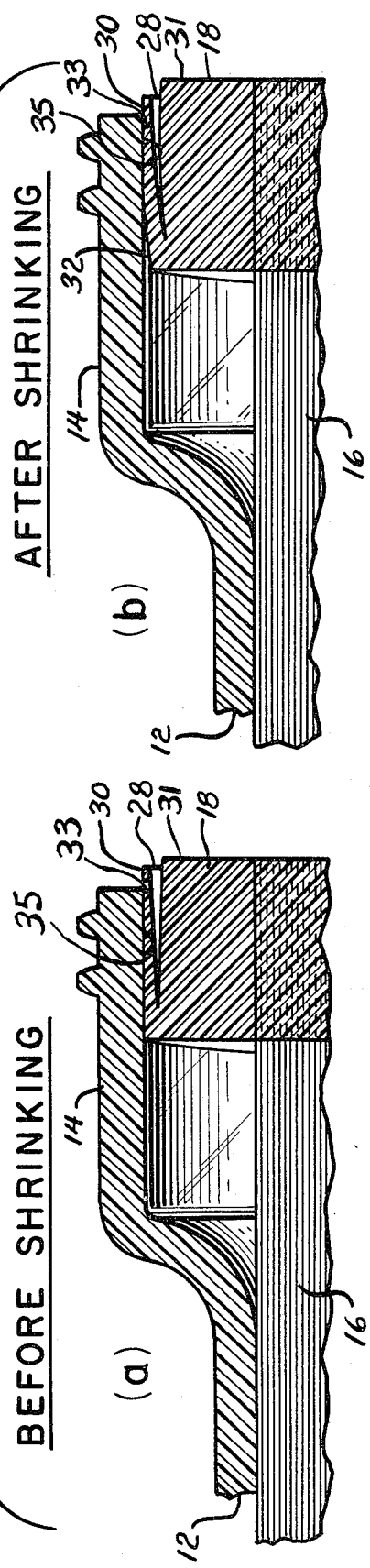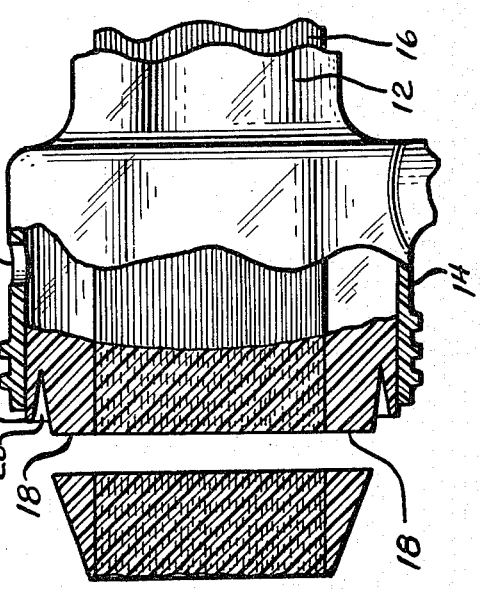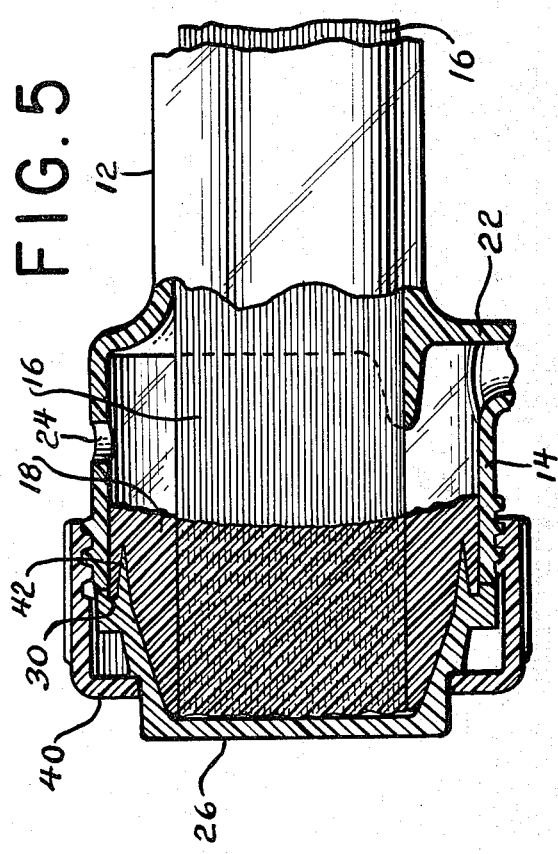

POTTED-TYPED SEAL WITH STRESS RELIEF AND METHOD OF MAKING SAME

The present invention generally relates to potted-type seals for sealing openings in relatively rigid housings, and more specifically, to means for preventing excessive shrinkage-induced stress in the bond area between the potting compound and the housing.

A common characteristic of many potting compounds such as polyurethane formulations or other elastomers, epoxies, waxes or paraffins, which are molded in a liquid or otherwise formable state and cure or cool to a solid state, is shrinkage during curing or cooling. When these compounds are used to seal openings in relatively rigid housings, such shrinkage causes inwardly directed stresses to develop along the bond or seal between the potting compound and housing. Heretofore, it has been the practice to use potting compounds which have bonding strengths greater than the stress imparted from shrinkage. Nevertheless, the high inwardly directed stresses which occur may occasionally result in a fractured seal, sometimes referred to a "pull-away", or a seal which is substantially weakened.

This shortcoming of potted-type seals is of particular interest in the medical field, where potting compounds are sometimes used to form sterile and/or liquid-tight seals in medical devices. For example, in the CF hollow fiber dialyzer sold by Travenol Laboratories, Inc. of Deerfield, Illinois, a bundle of thread-like hollow fibers are potted within each end of a relatively rigid tubular housing, which serves as a dialyzer manifold. End caps attached to each end of the housing direct blood flow through the hollow fibers, while a dialysate solution is circulated through the housing. The potting compound provides a seal between the open ends of the hollow fibers and the interior of the housing and prevents leakage of blood into the dialysate solution. Accordingly, it is important to assure that seal between the potting compound and housing has not been broken, i.e., pulled away, because of shrinkage-induced stress.

To verify integrity of the seal, however, necessitates careful quality control and inspection procedures. In addition, the CF dialyzer has employed a resilient o-ring seal between the potting compound and the end cap as further precaution against leakage. Although these efforts result in a satisfactory dialyzer, they contribute to the cost of the final product.

Accordingly, it is a general object of the present invention to provide an improved potted-type seal.

More specifically, it is an object of the present invention to provide a potted-type seal which may be molded within an opening in rigid housing without imparting undue stress on the seal between the potting compound and the housing.

It is a still further object of the present invention to provide a potted-type seal in which shrinkage of the mass of potting material is substantially isolated from the bonded area so as not to impart undue stresses.

These and other objects of the present invention are set forth more fully in the following detailed description of the preferred embodiment, as illustrated in the attached drawings, of which:

FIG. 1 is a side elevational view, partially in section, of a capillary flow dialyzer embodying the present invention.

FIG. 2 is an end view of the dialyzer of FIG. 1, taken along line 2—2.

FIG. 3 is a cross-sectional view of one end portion of the dialyzer of FIG. 1.

FIGS. 4(a) and 4(b) are enlarged cross-sectional views of an end portion of the dialyzer of FIG. 1, illustrating the potting compound before and after curing.

FIG. 5 illustrates apparatus employed in molding a potted seal embodying the present invention.

FIG. 6 illustrates the step of slicing or cutting a potted bundle of hollow fibers to expose the internal bores for blood flow therethrough.

FIG. 7 is a partial vertical sectional view of one end of a dialyzer employing an alternative embodiment of the present invention.

FIG. 8 is a partial vertical sectional view of one end of a dialyzer employing another embodiment of the present invention.

As set forth in the attached drawings for the purposes of illustration and not limitation, the present invention is generally embodied in a capillary flow-type dialyzer 10 which has a relatively rigid tubular plastic housing 12 with enlarged end portions 14. A bundle of thread-like hollow fibers 16 extend through the housing and are sealed within each end by a mass of potting compound 18. In operation, end caps or headers 20 direct the flow of blood into the dialyzer housing and through the micron-sized bores of the hollow fibers 16, as dialysate solution is circulated around the outside of the fibers between the side ports 22 in the housing 12. Referring briefly to FIGS. 5 and 6, the ends of the fibers are potted by injecting the potting compound 18 in the liquid state through a temporary aperture 24 in the enlarged end portion 14 of the housing 12. During this operation, a mold cap 26 is secured to the end of the housing to receive the potting compound, a portion of which, after curing, is sliced away to expose the bores of the hollow fibers. Various of these features are described more fully in the pending U.S. patent applications of Bert F. Bodnar and William J. Schnell, Ser. No. 928,477, filed July 27, 1978, entitled "Method of Potting the Ends of a Bundle of Hollow Fibers Positioned in a Casing" and of William J. Schnell, Ser. No. 931,340, filed Aug. 7, 1978 and entitled "End Seal for a Housing Enclosing a Resilient Mass".

In accordance with the present invention, and referring back to FIGS. 4(a) and 4(b), a reliable bond is provided between the potting compound 18 and the inside surface of the housing portion 14 by a stress relief feature which substantially isolates shrinkage-induced forces in the large center mass of potting compound from the peripheral edge portion which is sealed to the housing. In the preferred embodiment, the potting compound is of resilient flexible material, and parting means in the form of a narrow peripheral groove 28 separates the large center mass of potting compound from a thin annular lip or edge portion 30 which is sealed to the inside surface of the housing end portion 14, thus allowing most of the potting compound to shrink without causing excessive stress along the bond area. And even if shrinkage in the solid portion of the potting compound below the groove causes a fracture or pull-away 32, (FIG. 4(b)), the end of the relatively thin, flexible lip portion bends to accomodate this shrinkage without imparting undue stress on the remainder of the lip 30.

In alternative embodiments illustrated in FIGS. 7 and 8, the open end of the housing 12 is defined by a relatively flexible lip portion 34 which can flex inwardly to relieve shrinkage-induced stresses between the compound and the inner wall of the housing. In FIG. 8, the flexible lip 34 is formed by a v-shaped groove formed in the end edge of the housing rim. In FIG. 7, the relatively flexible lip 34 forms the entire rim of the end opening for the housing.

Turning now to a more detailed description of the present invention, as illustrated in the attached drawings, the tubular housing 12 is of one piece plastic construction, preferably molded from a clear plastic material which has high strength and is relatively rigid, e.g., plexiglass. The illustrated tubular housing 12 is generally circular in cross-sectional shape and, as noted earlier, terminates at each end with an enlarged cylindrical or bell-shaped portion 14. A side port 22 communicates dialysate solution along the length of the fiber bundle, preferably in a direction opposite the direction of flow of blood through the hollow fibers. A retaining ring 36 threaded to each enlarged end portion 14 holds the end cap 20 in sealed relationship against the potting compound 18. The end cap 20, in turn, has a center port 38 for communicating with the patient's circulatory system and also has an annular sealing ring 40 for better sealing against the potting compound.

To seal the bundle of the hollow, thread-like fibers 18, which are usually of cellulose material, within the housing 12, each end of the bundle of fibers is potted and then sliced to expose the bores of the fibers, as shown in FIGS. 5 and 6. The potting compound is preferably of a flexible resilient polyurethane formulation, although it may be selected from other elastomers or epoxies or waxes. As noted earlier, the potting compound is added in liquid form through temporary aperture 24 in the enlarged end portion of the housing 12. The housing is then rotated about an axis perpendicular to its longitudinal axis, somewhat like a propeller, to force the potting compound toward each end and into intimate contact with the side walls of the hollow fibers. This process is described more fully in U.S. Patent Application Ser. No. 928,477, identified above. As the potting compound cures or cools to a solid but resilient state, it also shrinks. This shrinkage, in turn, creates radially inward forces along the seal between the potting compound and the inner surface of the enlarged portion of the housing. If the inwardly directed forces are greater than the bonding strength between the compound and the housing, the seal may be completely broken, or the integrity of the seal may at least be compromised.

To relieve the stress arising during curing or cooling of the potting compound 18, in accordance with the present invention, shrinkage of the large center mass of potting compound is substantially isolated from the peripheral portion of the compound which is sealed to the surface of the housing. In accordance with the preferred embodiment, a continuous, annular v-shaped groove 28 is formed in the potting compound, spaced a small distance inwardly from the inside surface of the housing to define a tapered, elongated peripheral lip portion 30. As the potting compound cures, the groove 28 allows the large center portion to shrink without affecting the seal between the peripheral lip portion 30 and the inner surface of the housing. As shown in FIG. 4(b), even if shrinkage stress in the solid portion of the resilient potting compound below the groove 28 exceeds the bond strength between the compound and the housing, the slight pull-away 32 will only extend to approximately the bottom area of the groove, where the stress relief begins for the remaining portion of the elongated lip portion 30. The flexibility of the resilient potting compound permits the inward end of lip portion 30 to flex or deflect slightly inwardly to permit pullaway at the inner area of the mass of potting compound while maintaining a hermetic, liquid-tight seal between the remainder of the lip portion and the housing. Although the depth of the groove 28 and thickness of the lip 30 may vary depending on the circumstances, preferably the depth of the groove is greater than the thickness of the lip portion at it narrowest end. The potting compound 18, which is a sealing composition, has an end face 31. The groove 28 defined in the sealing composition 18 extends axially from end face 31 over a substantial portion of the axial dimension of the sealing compound 18. In this manner, the stresses induced on curing are substantially reduced in the portion 33 of the sealing composition 18 adjacent the open end of groove 28 which is bonded to peripheral surface 35 of housing 14.

The formation of the groove 28 to relieve shrinkage-induced stress in the potting compound is illustrated in FIG. 5. During the potting operation the mold cap 26 is temporarily attached to the housing 12 by a retaining ring 40 similar to that used for securing the end cap 20. The mold cap 26 is generally cup shaped, with a deep recess to receive a larger portion of potting compound and hollow fibers than is required for the finished product. The mold cap is formed of a material or has an inside coating which does not adhere to the potting compound. The cap includes an elongated annular v-shaped rim 40 of a diameter smaller than the side diameter of the enlarged portion 14 of the housing 12. Accordingly, when the mold cap is secured to the end of the housing, a small annular space remains between the v-shaped rim and the inside surface of the housing, wherein the annular lip portion 30 of the potting compound is formed.

The potting compound 18 is injected through temporary aperture 24 in the enlarged portion 14 in liquid form, although it may also be injected through side port 22, and the housing is spun like a propeller to force the potting compound toward each end. After molding is complete, the mold cap is removed and the potting compound is sliced as illustrated in FIG. 6 to remove the excess portion of compound and hollow fibers, and thus exposing the bores of hollow fibers at each end of the housing.

FIG. 2 illustrates, by end view, the resulting concentrically oriented product. The inner bundle of hollow fibers 16 is generally surrounded by an annular flat facing surface of potting compound 18 which is in turn circumscribed by the groove 28, the annular lip portion 30 and the edge of the enlarged portion of the housing 14.

As one example of the stress relief provided by the present invention, employing a polyurethane potting in a dialyzer housing as described above, it has been determined that in a perfectly rigid housing, shrinkage-induced stress in the area of the bond between the compound and the housing would be about 600 psi. Because plexiglass is not completely rigid, inherent flexure in the housing reduces the stress to about 300 psi, which may occasionally still be above the bond strength between the compound and housing. However, by employing a stress-relief groove 28 in accordance with the present invention, the stress between the flexural lip portion 30 of the potting compound 18 is reduced to about 50 psi, well below the bond breakage stress level.

Alternative embodiments of the present invention are illustrated in FIGS. 7 and 8. Referring to FIG. 8, the rim of the enlarged portion 14 of the housing has an annular groove 44 which extends into the end edge of the housing and defines a tapered lip portion 34 which is thinner and relatively more flexible than the rest of the housing. In FIG. 7, the end edge of the housing is molded as a thin lip portion, without employing a v-shaped groove as in FIG. 8. As compared to the annular lip portion 30 of the potting compound described above, the relatively thin flexural lips 34 of FIGS. 7 and 8 also bend at one end to accomodate inward shrinkage of the potting compound, although in FIGS. 7 and 8, the thin inward bending end of the lip 34 remains sealed to the potting compound 18, whereas in the preferred embodiment, the inward bending wide end of the lip portion 30 is slightly pulled-away at 32 by the solid portion of the potting compound.

Although the present invention has been described in terms of the preferred embodiment, it will be understood that various of the features described above may be modified or changed while still embodying the present invention. For example, the groove 28 in the potting compound 18 is illustrated as being generally v-shaped. However, any parting means, for example, a slit or a line of weakness or a plurality of grooves in the potting compound may provide the same beneficial results as the present invention and is within the scope hereof, as set forth in the following claims.

What is claimed is:

1. A relatively rigid housing having a peripheral surface defining an opening, and comprising a curable sealing composition disposed within said peripheral surface and filling said opening, said sealing composition including stress-relief means comprising a groove defined in the sealing composition and extending axially from one end face thereof over a substantial portion of the axial dimension of said sealing composition, whereby the stresses induced on curing are substantially reduced in the portion of the sealing composition adjacent the open end of the groove which is bonded to said peripheral surface, said groove forming a lip portion of the sealing composition and a central mass portion spaced from the lip portion by the groove, said groove being located close enough to said peripheral surface to allow the central mass portion of the sealing composition, that is located inward of the groove, to shrink upon curing but maintaining a bond between said lip portion and said peripheral surface of the housing.

2. A device as described in claim 1, in which said groove extends axially from one end face thereof to a point substantially adjacent the other end of the sealing composition.

3. A device as described in claim 1, including a bundle of thread-like fibers in the opening, said curable sealing composition encompassing the fibers and sealing the bundle of fibers in the opening, said groove being located between said bundle and said peripheral surface of said housing.

4. A hollow fiber medical device comprising a housing defining a chamber therewithin, inlet and outlet opening means in said housing communicating with said chamber, a plurality of hollow fibers extending between said inlet and outlet opening means, a curable sealing composition disposed within each of said inlet and outlet opening means and sealing the plurality of fibers therewithin, said sealing composition including stress-relief means comprising a groove defined in the sealing composition and extending axially from one end face thereof over a substantial portion of the axial dimension of said sealing composition, whereby the stresses induced on curing are substantially reduced in the portion of the sealing composition adjacent the open end of the groove which is bonded to said housing, said groove forming a lip portion of the sealing composition and a central mass portion spaced from the lip portion by the groove, said groove being located close enough to said housing to allow the central mass portion of the sealing composition, that is located inward of the groove, to shrink upon curing but maintain a bond between said lip portion and said housing.

5. A hollow fiber medical device as described in claim 4, in which said curable sealing composition encompasses the hollow fibers and seals a bundle of the hollow fibers in the inlet and outlet opening means, said groove being located between said bundle and said housing.

6. A hollow fiber medical device as described in claim 4, in which the groove extends axially from said one end face to a point substantially adjacent the other end of the sealing composition.

7. A method for forming an improved seal for a relatively rigid housing having a peripheral surface defining an opening, comprising the steps of:
 filling the opening with a curable sealing composition;
 forming a stress-relief means in said sealing composition which comprises the step of forming a groove in the sealing composition which extends axially from one end face thereof over a substantial portion of the axial dimension of the sealing composition, whereby the stresses induced on curing are substantially reduced in the portion of the sealing composition adjacent the open end of the groove which is bonded to said peripheral surface, said groove forming a lip portion of the sealing composition and a central mass portion spaced from the lip portion by the groove;
 said forming step including locating said groove close enough to said peripheral surface to allow the central mass portion of the sealing composition, that is located inward of the groove, to shrink upon curing but maintain a bond between said lip portion and said peripheral surface of the housing.

* * * * *